United States Patent
Hwang et al.

(10) Patent No.: US 12,528,076 B2
(45) Date of Patent: Jan. 20, 2026

(54) METHOD OF PREPARING PHOTOCATALYST COMPOSITE NANOFIBER SURROUNDED BY GRAPHENE OXIDE

(71) Applicant: INDUSTRY-ACADEMIC COOPERATION FOUNDATION, YONSEI UNIVERSITY, Seoul (KR)

(72) Inventors: Jung Ho Hwang, Seoul (KR); Sang Mo Kang, Gyeonggi-do (KR); Kang Sik Nam, Gyeonggi-do (KR); Ji Soo Choi, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 414 days.

(21) Appl. No.: 18/081,612

(22) Filed: Dec. 14, 2022

(65) Prior Publication Data

US 2023/0271166 A1      Aug. 31, 2023

(30) Foreign Application Priority Data

Feb. 28, 2022   (KR) .......................... 1020220026202

(51) Int. Cl.
| | | |
|---|---|---|
| *B01J 23/50* | (2006.01) | |
| *B01J 21/06* | (2006.01) | |
| *B01J 21/18* | (2006.01) | |
| *B01J 35/39* | (2024.01) | |
| *B01J 35/45* | (2024.01) | |
| *B01J 35/58* | (2024.01) | |
| *B01J 37/00* | (2006.01) | |
| *B01J 37/04* | (2006.01) | |

(Continued)

(52) U.S. Cl.
CPC ............ *B01J 23/50* (2013.01); *B01J 21/063* (2013.01); *B01J 21/18* (2013.01); *B01J 35/39* (2024.01); *B01J 35/45* (2024.01); *B01J 35/58* (2024.01); *B01J 37/0018* (2013.01); *B01J 37/04* (2013.01); *B01J 37/086* (2013.01); *B01J 37/088* (2013.01); *B01J 37/342* (2013.01); *B01J 2235/30* (2024.01)

(58) Field of Classification Search
None
See application file for complete search history.

(56) References Cited

FOREIGN PATENT DOCUMENTS

| CN | 110528113 A | * 12/2019 |
|---|---|---|
| KR | 1020150119697 | 10/2015 |

(Continued)

OTHER PUBLICATIONS

CN-110528113-A, English translation (Year: 2019).*
Korean Office Action for KR 10-2022-0026202, Office Action Issue Date: Oct. 16, 2023.

*Primary Examiner* — Stefanie J Cohen
(74) *Attorney, Agent, or Firm* — Myers Bigel, P.A.

(57) ABSTRACT

The present invention relates to a method of preparing a photocatalyst composite nanofiber using coaxial electrospinning and a photocatalyst composite nanofiber prepared by the same method, and when the photocatalyst composite nanofiber is prepared by such a method, noble metal particles are located on the fiber surface and rGO surrounds the nanofiber, thereby improving photocatalytic performance and reducing costs, and being capable of being applied in various industrial fields for antibacterial treatment and deodorization.

5 Claims, 3 Drawing Sheets

(51) Int. Cl.
*B01J 37/08* (2006.01)
*B01J 37/34* (2006.01)

(56) References Cited

FOREIGN PATENT DOCUMENTS

| KR | 1020190007590 | 1/2019 |
|---|---|---|
| KR | 1020190007590 X | 1/2019 |

\* cited by examiner

[FIG. 1]
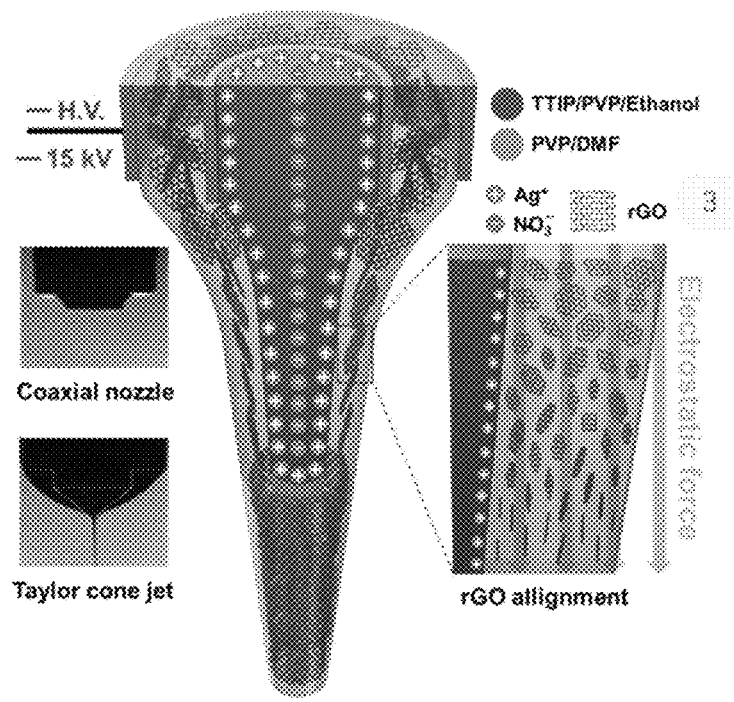
[FIG. 2]
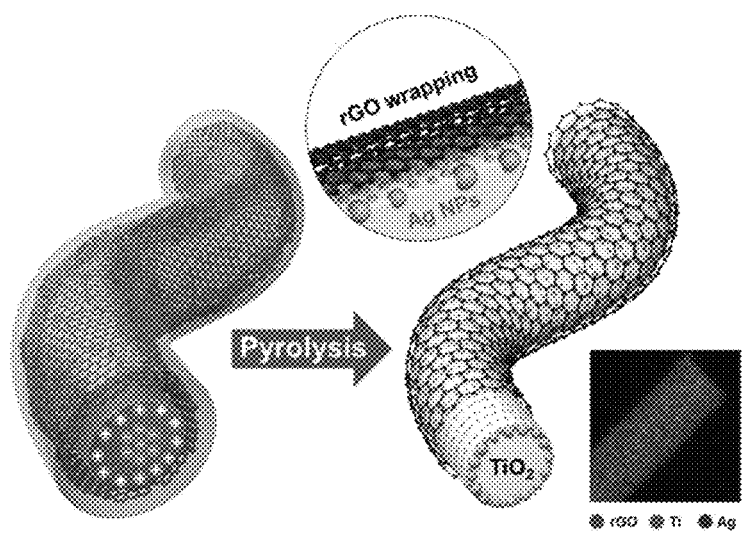

[FIG. 3]
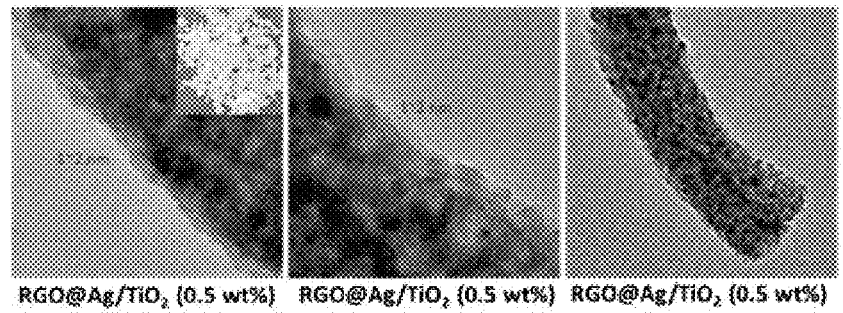
[FIG. 4]
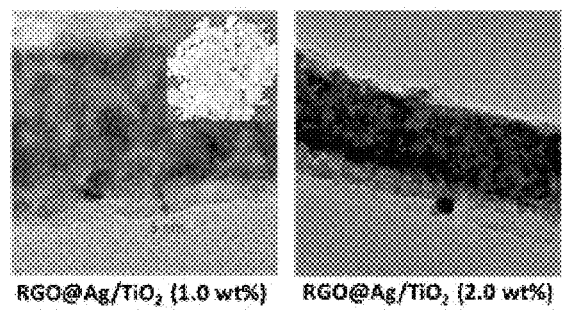
[FIG. 5]
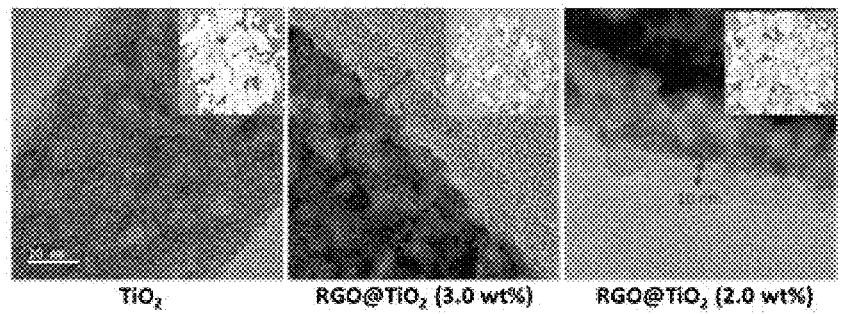

[FIG. 6]
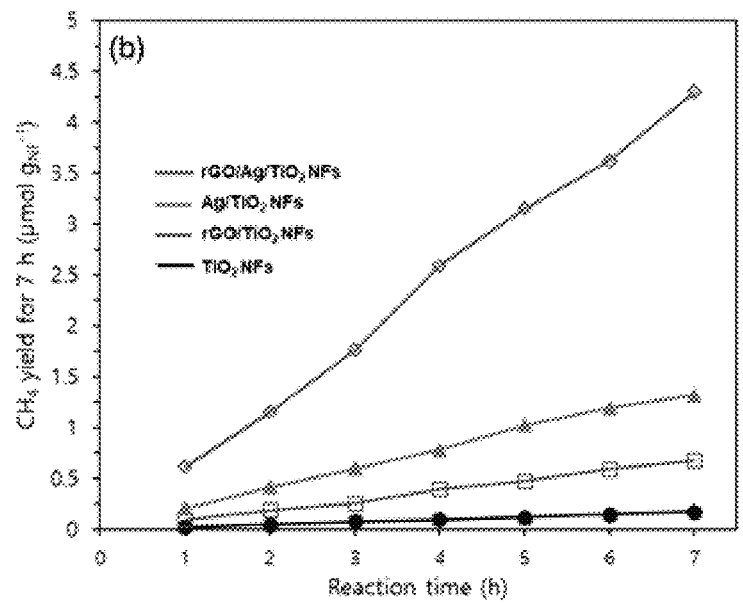
[FIG. 7]
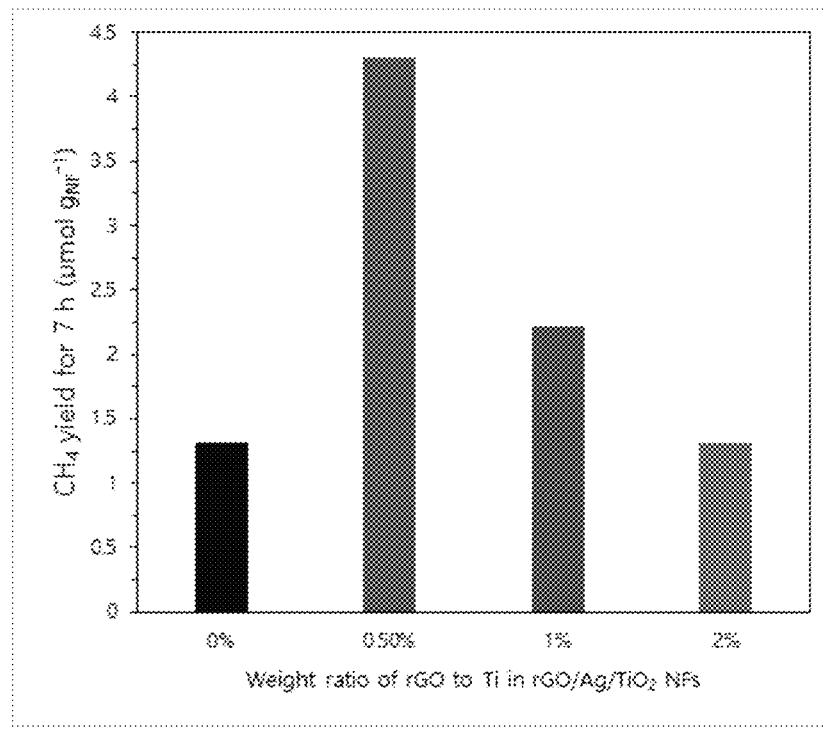

METHOD OF PREPARING PHOTOCATALYST COMPOSITE NANOFIBER SURROUNDED BY GRAPHENE OXIDE

CROSS-REFERENCE TO RELATED APPLICATION

This application claims priority to and the benefit of Korean Patent Application No. 2022-0026202, filed on Feb. 28, 2022, the disclosure of which is incorporated herein by reference in its entirety.

BACKGROUND

1. Field of the Invention

The present invention relates to a method of preparing a photocatalyst composite nanofiber surrounded by graphene oxide, and more particularly, to a method of preparing a photocatalyst composite nanofiber surrounded by reduced graphene oxide using coaxial electrospinning and a photocatalyst composite nanofiber prepared thereby.

2. Discussion of the Background

Recently, graphene materials have been in the spotlight in the corresponding field of technology because they can play an important role in improving photocatalytic performance. It has been known that graphene used as a high-efficiency electron acceptor and transporter can improve the efficiency of separating electrons and holes generated in an artificial photosynthetic reaction, and a graphene oxide material having a hydroxyl group and an extended pi ($\pi$) bond can improve adsorption and activation capacities of $CO_2$ and $H_2O$ molecules.

In addition, in order to activate a photocatalyst under visible light, a technique of doping a photocatalyst surface with noble metal particles has been widely used. It was confirmed that electrons are generated under visible light due to a local surface plasmon resonance effect exerted by noble metal particles and it is possible to use them in various reactions. To adhere graphene, graphene oxide and a noble metal to the surface of a nanofiber, the impregnation method in which the nanofiber is immersed in a solution in which the graphene, the graphene oxide and the noble metal are mixed is used, and in this case, the thicknesses thereof could not be predicted, and the uniform surface distribution of the graphene and the noble metal could not be guaranteed. In addition, in the case of using the electrospinning method, when a nanofiber was produced by mixing graphene, graphene oxide and a noble metal in a solution, the graphene and noble metal components were embedded in the nanofiber, making it difficult to properly utilize the graphene and noble metal components.

Therefore, there is a need for technology of preparing a photocatalytic nanofiber that can realize a controlled thickness of the graphene oxide as well as positioning the noble metal and graphene on the nanofiber surface.

SUMMARY OF THE INVENTION

To solve the conventional problem, the present invention is for positioning a noble metal particle on a nanofiber surface, controlling the thickness of the reduced graphene oxide while making reduced graphene oxide surround the entire surface of the fiber, and further improving photocatalytic efficiency.

The present inventors confirmed that when a specific material is injected into different nozzles using coaxial electrospinning, it is possible to prepare a photocatalytic nanofiber in a form in which a noble metal is positioned on a fiber surface and graphene oxide surrounds the entire surface of the fiber, and thus completed the present invention.

Therefore, the present invention provides a method of preparing a photocatalyst composite nanofiber, which includes: preparing an internal nozzle solution including a metal oxide precursor, a polymer, and a noble metal salt; preparing an external nozzle solution including a polymer and reduced graphene oxide; performing coaxial electrospinning using the internal nozzle solution and the external nozzle solution; and heating a nanofiber prepared by coaxial electrospinning.

In addition, the present invention provides a photocatalyst composite nanofiber in which reduced graphene oxide surrounds a nanofiber including a noble metal and a metal oxide, prepared by the above preparation method of the present invention.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 1 is a schematic illustration and image of coaxial electrospinning with negative electric potential and alignment of rGO;

FIG. 2 is an image of composite nanofiber prepared according to one embodiment of the present invention;

FIG. 3 is a set of TEM images showing a composite nanofiber prepared according to Example 1 of the present invention;

FIG. 4 is a set of TEM images showing composite nanofibers prepared according to Examples 2 and 3 of the present invention;

FIG. 5 is a set of TEM images showing a composite nanofiber prepared according to Comparative Example 1 of the present invention;

FIG. 6 is a graph showing the performance of $CO_2$ photocatalytic efficiency of Comparative Examples 1 to 3 and Example 1; and FIG. 7 is a graph showing the performance of $CO_2$ photocatalytic efficiency of Examples 1 to 3 and Comparative Example 1.

DETAILED DESCRIPTION OF EXEMPLARY EMBODIMENTS

Hereinafter, the present invention will be described with reference to the accompanying drawings.

Meanwhile, descriptions and embodiments disclosed herein may also apply to other descriptions and embodiments. That is, all combinations of various elements disclosed herein are included in the scope of the present invention. In addition, it cannot be said that the scope of the present invention is limited by the detailed description to be described below.

When a part "includes" a certain component, it means that this part may further include another component without excluding the other component, unless particularly stated otherwise.

The present invention relates to a method of preparing a photocatalyst composite nanofiber.

Specifically, the method of preparing a photocatalyst composite nanofiber according to the present invention includes preparing an internal nozzle solution including a metal oxide precursor, a polymer, and a noble metal salt;

preparing an external nozzle solution including a polymer and reduced graphene oxide;

performing coaxial electrospinning using the internal nozzle solution and the external nozzle solution; and heating a nanofiber prepared by coaxial electrospinning.

The "electrospinning" used herein is a method of implementing a fiber having a diameter ranging from micrometers to nanometers using an electric field, and largely uses a high voltage power supply, a nozzle and a substrate for collecting fibers. Specifically, a fiber solution may be sprayed through a nozzle using a syringe pump, an electrode at one side may connect a high voltage power supply with a nozzle tip so as to inject an electric charge to the ejected fiber solution to charge, and an electrode at the opposite side may be connected to a substrate, the solution may be sprayed from the tip of the nozzle, thereby being obtained in the form of randomly arranged fibers on the substrate.

The "coaxial electrospinning," developed from the general electrospinning process, is an electrospinning method performed while independently ejecting two different solutions from an internal nozzle and an external nozzle, and a method of simultaneously performing electrospinning in the form of a concentric cross-section by stretching two solutions without mixing with each other.

In the step of preparing an internal nozzle solution, an internal nozzle solution may be prepared by mixing a metal oxide precursor, a polymer, and a noble metal salt.

The metal oxide precursor can be any precursor that forms a metal oxide exhibiting visible light activity without limitation. Specifically, the metal oxide precursor can be any precursor that forms a metal oxide exhibiting visible light activity after coaxial electrospinning and thermal decomposition according to the present invention without limitation.

Here, the metal oxide may include one or more selected from the group consisting of titanium dioxide, zinc oxide, tungsten oxide, niobium oxide, cerium (IV) oxide, and a combination thereof.

When the metal oxide is titanium dioxide, examples of its metal oxide precursor may include titanium propoxide, titanium isopropoxide, titanium diisopropoxide, titanium butoxide, titanium ethoxide, titanium methoxide, titanium tetrachloride, or titanium nitride.

When the metal oxide is zinc oxide, examples of its metal oxide precursor may include zinc chloride, zinc acetate, zinc nitrate, zinc sulfate, or a hydrate thereof.

More specifically, the metal oxide may be titanium dioxide or zinc oxide, and the metal oxide precursor may be one or more selected from the group consisting of titanium isopropoxide, titanium butoxide and zinc acetate.

Meanwhile, the noble metal salt has a form capable of becoming noble metal particles after coaxial electrospinning and thermal decomposition according to the present invention. Here, the noble metal is a metal that is not easily oxidized, and can facilitate the separation of electrons and holes from energy obtained by absorbing light, resulting in photocatalytic activity under visible light.

The noble metal salt may be converted into metal particles due to the reduction of metal cations through the preparation method of the present invention and thus may be located on the surface of the nanofiber. Specifically, the noble metal salt may be located on the metal oxide of a nanofiber and deposited.

The noble metal salt may be one or more selected from the group consisting of a noble metal chloride, a noble metal hydroxide, a noble metal oxide, a noble metal sulfoxide, and a noble metal nitrate.

The noble metal may be one or more selected from the group consisting of platinum (Pt), gold (Au), silver (Ag), ruthenium (Ru), rhodium (Rh), palladium (Pd), osmium (Os), and iridium (Ir).

More specifically, the noble metal salt in the present invention may be one or more selected from the group consisting of $AgNO_3$, $PtCl_4$, $AgCl$, $AuNO_3$, and $AuCl$, and more preferably, $AgNO_3$.

In the step of preparing an internal nozzle solution, a polymer is not limited as long as it is thermally decomposed after coaxial electrospinning. The polymer may include one or more selected from the group consisting of polymethyl methacrylate (PMMA), polymethyl acrylate (PMA), a polyacryl copolymer, a polyvinyl acetate copolymer, polyvinyl acetate (PVAc), polyvinylpyrrolidone (PVP), polymethyl alcohol (PVA), polystyrene (PS), a polystyrene copolymer, styrene-acrylonitrile (SAN) and polyvinyl alcohol (PVA).

More specifically, the polymer may be polymethylmethacrylate (PMMA) or polyvinyl pyrrolidone (PVP).

The metal oxide precursor in the internal nozzle solution may be included at 1 to 10 wt % with respect to the total weight of the internal nozzle solution.

The noble metal salt may be included at 0.1 to 5 wt % with respect to the total weight of the internal nozzle solution. More specifically, the noble metal salt may be included at 0.1 to 3 wt %, or 0.2 to 1 wt %.

The polymer may be included at 5 to 30 wt % with respect to the total weight of the internal nozzle solution.

In the step of preparing an external nozzle solution, an external nozzle solution including a polymer and reduced graphene oxide may be prepared.

Here, the same polymer may be applied as the polymer used in the step of preparing an internal nozzle solution. In addition, the types of polymers in an internal nozzle solution and an external nozzle solution may be the same or different from each other.

Reduced graphene oxide (rGO) may mean graphene oxide that has undergone a reduction process, and graphene oxide with a reduced oxygen proportion. The rGO may be, but is not particularly limited to, any one of rGO prepared in various methods known in the art. For example, the rGO may be obtained by a thermal reduction or thermal-chemical reduction process of graphene.

The rGO in the external nozzle solution may be included at 0.1 to 5 wt % with respect to the metal weight in the metal oxide precursor. Specifically, the rGO may be included in the external nozzle solution specifically at 0.1 to 3 wt %, 0.3 to 2.5 wt %, 0.3 to 1.5 wt %, or 0.3 to 0.8 wt %. When the content of the rGO exceeds the above range, it may be difficult for light to reach the metal oxide of the nanofiber, and when the content of the rGO is less than the above range, electron separation efficiency may decrease.

The polymer in the external nozzle solution may be included at 5 to 30 wt % with respect to the total weight of the external nozzle solution. Specifically, the polymer may be included in the external nozzle solution specifically at 8 to 25 wt %, 10 to 25 wt %, 10 to 20 wt %, or 12 to 18 wt %.

Each of the internal nozzle solution and the external nozzle solution may further include a solvent, and the type of solvents may be the same as or different from each other.

The solvent may be one or more selected from the group consisting of distilled water, diemthylformamide (DMF), dimethyl acetate, methanol, ethanol, acetone, ethylene glycol, n-butanol, tert-butyl alcohol, isopropyl alcohol, n-propanol, ethyl acetate, dimethyl sulfoxide, tetrahydrofuran, and a mixture thereof. Specifically, both the internal nozzle solution and the external nozzle solution may use dimethylformamide (DMF).

A coaxial electrospinning nozzle may be formed in a coaxial dual cylinder structure, and thus can simultaneously spin the internal nozzle solution and the external nozzle solution in the form of a concentric cross-section without mixing the solutions.

During the coaxial electrospinning, a solution spun from the internal nozzle was referred to as the internal nozzle solution, and a solution spun from the external nozzle was referred to as the external nozzle solution, and the external nozzle solution may be located to surround the internal nozzle solution.

In the coaxial electrospinning according to the present invention, the external nozzle solution in the external nozzle may be spun in the form of a hollow cylinder, and the internal nozzle solution in the internal nozzle may be ejected while filling the inside of the external nozzle solution and may be solidified to a nanofiber having a coaxial dual layer structure by applying a negative voltage to such nozzles.

Here, the spinning flow rates of the internal nozzle solution and the external nozzle solution may be 1 to 10 microliters/min, but the present invention is not particularly limited. In addition, the spinning flow rates of the internal nozzle solution and the external nozzle solution may be the same as each other, or the spinning flow rate of the external nozzle solution may be larger than that of the internal nozzle solution. Preferably, the spinning flow rate through the external nozzle may be larger than that through the internal nozzle.

The diameters of the nozzles used in coaxial electrospinning may be 0.3 to 1 mm for the internal nozzle, and 1 to 2 mm for the external nozzle, but the present invention is not particularly limited thereto.

The coaxial electrospinning may be performed for more than 0 and less than 72 hours.

In coaxial electrospinning with an internal nozzle solution containing a metal oxide precursor, a polymer and a noble metal salt and an external nozzle solution containing a polymer and rGO, a nanofiber with a desired structure may be prepared. Specifically, while noble metal cations in the internal nozzle solution are located on the nanofiber surface, rGO in the external nozzle solution may implement the form that surrounds the entire fiber over the fiber surface formed by the internal nozzle solution, such as noble metal cations.

Here, rGO having a dipole moment by a negative voltage applied to the coaxial electrospinning nozzles may be aligned in the direction of the electric field and may have a form surrounding the nanofibers.

Afterward, through the heating step to be described later, the metal oxide precursor may be changed into a metal oxide, the metal cations of the noble metal salt may be changed into noble metal particles, resulting in polymer decomposition.

As a result, according to the preparation method of the present invention, a fiber containing a metal oxide and noble metal particles, in which noble metal particles are located on the fiber surface and rGO surrounds the entire fiber, may be prepared.

When rGO surrounds the nanofiber containing the noble metal particles and the metal oxide, due to the application of light, a photocatalyst may be easily activated by rGO with a small thickness, so electrons may migrate from the noble metal particles to rGO, from the metal oxide to rGO, or from the noble metal to rGO via the metal oxide.

Meanwhile, the preparation method of the present invention includes heating the nanofiber prepared by coaxial electrospinning. Such a heating step may decompose polymers contained in the internal nozzle solution and the external nozzle solution, convert the noble metal cations into noble metal particles, and convert the metal oxide precursor into a metal oxide, resulting in a noble metal/metal oxide composite nanofiber surrounded by rGO.

In the heating step, a heating temperature is not limited as long as it is a temperature that can decompose a polymer, and specifically, the temperature may be 200 to 600° C., and more specifically, 250 to 550° C., or 300 to 500° C.

More specifically, the heating step of the present invention may be heating to 200 to 600° C. for 1 to 6 hours.

The coaxial electrospinning step and the heating step may be performed in a roll-to-roll process. Specifically, a nanofiber may be attached to the lower surface of a film by coaxial electrospinning, the film may be transferred using one or more rollers, a heating device is located between the rollers, and the coaxially electrospun fiber is thermally decomposed by such a heating device, thereby finally preparing a composite nanofiber of the present invention. When using the roll-to-roll method, high production speed and yield may be acquired, production costs can be reduced, and a large-area substrate can be continuously prepared.

The present invention also provides a photocatalyst composite nanofiber in which a nanofiber containing noble metal and a metal oxide is surrounded by rGO, which is prepared by the above preparation method.

Here, the noble metal may be located on the surface of the nanofiber, and rGO may be formed to surround the surface thereof.

The thickness of the RrGO in the photocatalyst composite nanofiber of the present invention may be 1 to 10 nm.

The photocatalyst composite nanofiber of the present invention may be used in the antibacterial, antiviral and antimicrobial fields, and the deodorizing field.

The description of the method of preparing a composite nanofiber may be equally applied to the photocatalyst composite nanofiber of the present invention.

Hereinafter, to help in understanding the present invention, exemplary examples will be suggested. However, the following examples are merely provided to more easily understand the present invention, and not to limit the present invention.

EXAMPLES

Preparation Example 1. Preparation of Example 1

Preparation of Reduced Graphene Oxide (rGO)

30 mg of graphene oxide was added to 25 mL of a dimethylformamide (DMF) solution and sonicated for 1 hour to obtain a dark brown graphene oxide (GO) suspension. 25 mL of ethylenediamine (EDA) was added dropwise to the GO suspension at 90° C. for 3 hours, thereby obtaining a black aqueous rGO dispersion. The dispersion was washed with ethanol, and the prepared rGO suspension was centrifuged to remove excess EDA and DMF. This procedure was repeated five times, and the resultant was then dried in a 60° C. oven for 1 hour.

Preparation of Composite Nanofibers (0.6% rGO/Ag/$TiO_2$ NFs) of Example 1

An internal nozzle solution was obtained by mixing 1 g of titanium isopropoxide (TTIP), 0.45 g of polyvinylpyrrolidone (PVP), 3 mL of acetic acid, and $AgNO_3$ (molar ratio of $AgNO_3$ with respect to Ti was 0.5%) in 6 mL of ethanol. An external nozzle solution was obtained by mixing rGO and PVP (15 wt %) in DMF. Each solution was stirred at 60° C., and the weight ratio of rGO to Ti was 0.5 wt %.

Coaxial electrospinning was performed by injecting the internal nozzle solution through an internal nozzle (the internal diameter of the internal nozzle=0.5 mm, the external diameter thereof=0.8 mm) and the external nozzle solution through an external nozzle (the internal diameter of the external nozzle=1.26 mm, the external diameter thereof=1.66 mm), and the injection speeds were 4 and 10 µL/min, respectively, and the DC voltage of the nozzles was −15 kV.

The prepared composite nanofiber was treated at 500° C. in air for 2 hours, under $N_2$ for 1 hour (flow rate: 2 L/min) to remove PVP, thereby preparing a composite nanofiber (rGO wrapped Ag/$TiO_2$ NFs) according to Example 1.

As shown in FIG. 3, it can be confirmed that the composite nanofiber prepared according to Example 1 has a form in which the surface of $TiO_2$ is surrounded by rGO. In addition, it can be confirmed that the composite nanofiber of Example 1 was uniformly formed to have a small thickness since the thickness of rGO was 1 to 2 nm.

Preparation of Composite Nanofibers (1% and 2% rGO/Ag/$TiO_2$ NFs) of Examples 2 and 3

Examples 2 and 3 were prepared in the same manner except that the weight ratios of rGO in Example 1 were set differently to 1% and 2%, respectively.

As shown in FIG. 4, it was confirmed that, in Examples 2 and 3, rGO which has a different content from that of Example 1 and also has a small thickness of approximately 5 nm was formed on each composite nanofiber.

Preparation Example 2. Preparation of Comparative Example

Preparation of Comparative Examples 1 to 3

Comparative Example 1 (Ag/$TiO_2$ NFs) was prepared under the same conditions, except that rGO was not added to an external nozzle solution in Example 1.

Comparative Example 2 (rGO/$TiO_2$ NFs) was prepared under the same conditions, except that $AgNO_3$ was not added in Example 1.

Comparative Example 3 ($TiO_2$ NFs) was prepared in the same manner as Comparative Example 1, except that $AgNO_3$ was not added to the internal nozzle solution of Comparative Example 1.

As shown in FIG. 5, it was confirmed that, in Comparative Example 1, a composite nanofiber was prepared only with $TiO_2$ because rGO was not added.

Experimental Example 1. Evaluation of $CO_2$ Photocatalytic Reduction Efficiency 2.0 g each of the nanofibers prepared in Preparation Examples 1 and 2 was dispersed uniformly in a quartz reactor having an area of 4.0 cm². High purity $CO_2$ (99.99%) was bubbled using water to inject a mixture of $CO_2$ and water vapor into a reactor under atmospheric pressure.

Prior to irradiation with visible light, $CO_2$ flowed through the reactor for 30 minutes at 300 ml/min to remove air in the reactor. Afterward, for the light reaction, $CO_2$ was injected at a flow rate of 10.0 ml/min, and visible light was applied using a 500 W Xe lamp (wavelength: 185 to 2000 nm, DY. Tech.) with a 400-nm long-pass filter, the irradiation intensity was 10 mW/cm², and the temperature was 301 to 303K.

The gas produced during visible light irradiation was collected and analyzed by a gas chromatograph equipped with a flame ionization detector (Agilent, 7890B) to confirm the $CO_2$ reduction efficiency of reducing water to $CH_4$. All experiments were repeated three times, and the average value was calculated.

First, FIG. 6 shows a graph for $CH_4$ formation yields of Comparative Example 1 (Ag/$TiO_2$ NFs), Comparative Example 2 (rGO/$TiO_2$ NFs), Comparative Example 3 ($TiO_2$ NFs), and Example 1 (0.5% rGO/Ag/$TiO_2$ NFs). As shown in FIG. 6, it can be confirmed that Example 1 (0.5% rGO/Ag/$TiO_2$ NFs) according to the present invention exhibits the highest photocatalytic performance. In addition, the photocatalytic performance was shown in the order of Comparative Example 1>Comparative Example 2>Comparative Example 3.

rGO may collect and transfer electrons, and Ag doping may lead to an improved photoreduction reaction under visible light, and electrons transferred from $TiO_2$ to Ag may react more efficiently with a $CO_2$ molecule. The photocatalytic activity of $CO_2$ reduction that reduces $H_2O$ to $CH_4$ was improved by incorporating rGO and Ag into $TiO_2$ NFs, and therefore, it can be seen that the composite nanofiber according to the present invention including all of rGO, Ag and $TiO_2$ can improve photocatalytic efficiency.

FIG. 7 shows graph for the performance of $CO_2$ photocatalytic efficiency of Examples 1 to 3 and Comparative Example 1 in which the rGO weight ratio with respect to Ti is changed. When the weight ratio of rGO was 0.5%, it can be confirmed that the total yield of $CH_4$ was the highest at 4.3 µmol/gNFs, and the yield tends to decrease as the weight ratio increases. This means that, in the form in which rGO surrounds the nanofiber, the separation efficiency of electron-hole pairs increases, but as the rGO thickness increases, it may be difficult for light to reach the surface of the $TiO_2$ nanofiber, implying a decrease in photocatalytic performance.

When a photocatalyst composite nanofiber is prepared by a method of the present invention, the fiber surface is surrounded by graphene oxide to easily cause a photocatalytic reaction, and thus photocatalytic performance can greatly increase. For example, a highly efficient photocatalyst capable of reducing carbon dioxide to hydrocarbons can be obtained even under visible light.

In addition, a continuous roll-to-roll process can prepare the nanofiber according to the present invention, thereby enabling mass production and cost reduction and use in various industrial fields regarding the reduction of carbon dioxide, the decomposition of a volatile organic compound, and a functional filter for anti-bacterial/viral action.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A method of preparing a photocatalyst composite nanofiber, comprising:
    preparing an internal nozzle solution comprising a metal oxide precursor, a polymer, and a noble metal salt;
    preparing an external nozzle solution comprising a polymer and reduced graphene oxide (rGO);
    performing coaxial electrospinning using the internal nozzle solution and the external nozzle solution to obtain a nanofiber; and
    heating the nanofiber prepared by coaxial electrospinning,
    wherein the noble metal salt is one or more selected from the group consisting of $AgNO_3$, $PtCl_4$, AgCl, $AuNO_3$, and AuCl, and
    wherein the heating is performed for 1 to 6 hours at 200° C. to 600° C.

2. The method of claim 1, wherein the metal oxide precursor is one or more selected from the group consisting of titanium isopropoxide, titanium butoxide and zinc acetate.

3. The method of claim 1, wherein the polymer comprises one or more selected from the group consisting of polymethyl methacrylate (PMMA), polymethyl acrylate (PMA), a polyacryl copolymer, a polyvinyl acetate copolymer, polyvinyl acetate (PVAc), polyvinylpyrrolidone (PVP), polymethyl alcohol (PVA), polystyrene (PS), a polystyrene copolymer, styrene-acrylonitrile (SAN), and polyvinyl alcohol (PVA).

4. The method of claim 1, wherein the content of rGO is 0.1 to 5 wt % with respect to the metal weight in the metal oxide precursor.

5. The method of claim 1, wherein, in the coaxial electrospinning, the spinning flow rate of the external nozzle is higher than that of the internal nozzle.

* * * * *